United States Patent [19]

Sakurai et al.

[11] Patent Number: 4,644,926
[45] Date of Patent: Feb. 24, 1987

[54] DIESEL CYCLE ENGINES HAVING HEAT INSULATED AUXILIARY COMBUSTION CHAMBERS

[75] Inventors: Shigeru Sakurai; Shigeki Hamada, both of Hiroshima, Japan

[73] Assignee: Mazda Motor Corporation, Hiroshima, Japan

[21] Appl. No.: 712,850

[22] Filed: Mar. 18, 1985

[30] Foreign Application Priority Data

Mar. 17, 1984 [JP] Japan .................................. 59-51597

[51] Int. Cl.$^4$ ............................................ F02M 25/06
[52] U.S. Cl. .................................. 123/569; 123/271; 123/571
[58] Field of Search ............... 123/568, 569, 571, 501, 123/435, 270, 271, 275

[56] References Cited

U.S. PATENT DOCUMENTS

| | | | |
|---|---|---|---|
| 3,259,116 | 7/1966 | Bricout | 123/268 |
| 4,325,334 | 4/1982 | Nishida et al. | 123/270 |
| 4,369,753 | 1/1983 | Sugiyama | 123/569 |
| 4,411,242 | 10/1983 | Igashira et al. | 123/569 |
| 4,450,824 | 5/1984 | Ando et al. | 123/571 X |
| 4,450,825 | 5/1984 | Sekiguchi et al. | 123/571 X |
| 4,479,473 | 10/1984 | Wade | 123/569 X |

FOREIGN PATENT DOCUMENTS 0017092 6/1979 Japan .
0175118 11/1983 Japan .

*Primary Examiner*—Willis R. Wolfe, Jr.
*Attorney, Agent, or Firm*—Fleit, Jacobson, Cohn and Price

[57] ABSTRACT

A diesel engine including an auxiliary or swirl chamber provided in the cylinder head and in communication with a main combustion chamber. The auxiliary chamber is defined in a shell structure which is located in the cylinder head and provided with a heat insulating structure. The engine includes an exhaust gas recirculating system in which the exhaust gas recirculation ratio, expressed as a percentage, is controlled in a range between $(60-100 \times 1/\lambda)$ and $(140-210 \times 1/\lambda)$, where $\lambda$ is the excess air ratio.

11 Claims, 10 Drawing Figures

DIESEL CYCLE ENGINES HAVING HEAT INSULATED AUXILIARY COMBUSTION CHAMBERS

BACKGROUND OF THE INVENTION

1. Field of the Invention

The present invention relates to diesel cycle engines and more particularly to diesel cycle engines having auxiliary combustion chambers or so-called swirl chambers. More specifically, the present invention pertains to exhaust gas recirculation means for such swirl chamber type diesel engines.

2. Description of the Prior Art

In the art of diesel cycle engines, the exhaust gas from the engine includes noxious components such as nitrogen oxides, carbon monoxide and so-called particulates, which include smoke forming carbon particles, particles of liquid fuel containing hydrocarbon and other particles such as metal particles. In order to decrease the emission of nitrogen oxides, an exhaust gas recirculation system has been adopted to return a part of the exhaust gas to the intake system in an amount which is controlled in accordance with the engine operating condition. In view of the fact that the excess air which is not used for combustion in diesel engines decreases in response to an increase in the engine load, it has been a common practice to decrease the amount of the recirculation gas or to stop the recirculation of the exhaust gas. For example, Japanese patent publication No. 54-17092 describes a control wherein the exhaust gas recirculation ratio, which is defined as a ratio of the amount of the recirculated gas to the amount of the total intake gas, is decreased in accordance with an increase in the engine load. U.S. Pat. No. 4,369,753 teaches to increase the exhaust gas recirculation under light load operation.

In diesel engines of the swirl chamber type, it has already been proposed to provide the swirl chamber with a heat insulating structure in order to maintain a satisfactorily high temperature in the swirl chamber even under light load or low temperature engine operation. For example, U.S. Pat. No. 3,259,116 discloses a diesel engine having an auxiliary or swirl chamber made of a refractory material located in the cylinder head with a heat insulative space encircling the auxiliary chamber. The Japanese utility model application No. 57-71421 filed on May 18, 1982 and disclosed for public inspection under the disclosure No. 58-175118 on Nov. 22, 1983 teaches to provide the auxiliary chamber with a refractory ceramic material and locate the chamber in the cylinder head with a heat insulative space therebetween. The auxiliary chamber may partly or wholly be made of a heat insulative ceramic material. For example, the upper half of the auxiliary chamber may be made of a heat insulative ceramic material such as zirconum oxides, and the lower half, which is adapted to be located adjacent to the top surface of the cylinder, may be made of a refractory ceramic material such as silicon nitrides, which have a high thermal shock resistance. This structure may make the heat insulative space unnecessary.

In the diesel engines having auxiliary chambers of a heat insulative structure, it is possible to increase temperature in the chamber so that the combustion of fuel can be enhanced. As the result, it is possible to obtain an increased engine output as compared with a conventional diesel engine having an auxiliary chamber, of which an upper half is made of aluminum alloy and a lower half made of steel or cast iron. It should also be pointed out that the increase in temperature of the chamber is effective to decrease the emission of the particulates in the exhaust gas. It has however been recognized that, in this type of engine, the increased combustion temperature causes an increase in the emission of nitrogen oxides and that conventional controls of exhaust gas recirculation cannot effectively suppress the emission of nitrogen oxides and sometimes have adverse effects on the emission of particulates.

OBJECT OF THE INVENTION

It is therefore an object of the present invention to provide a diesel engine having an auxiliary chamber, in which emissions of nitrogen oxides and particulates can simultaneously be decreased.

Another object of the present invention is to provide a diesel engine having an auxiliary chamber provided with a heat insulative structure and an exhaust gas recirculation control system which together can suppress the emissions of nitrogen oxides and particulates.

A further object of the present invention is to provide an exhaust gas recirculation control system for a diesel engine having an auxiliary chamber, with which emissions of nitrogen oxides and particulates can simultaneously be suppressed.

SUMMARY OF THE INVENTION

According to the present invention, the above and other objects can be accomplished by a diesel engine including main combustion chamber means communicating with intake and exhaust systems, auxiliary chamber means connected with said main combustion chamber means, heat insulation means for providing a heat insulating property in said auxiliary chamber means, exhaust gas recirculation means for recirculating a controlled amount of exhaust gas from said exhaust system to said intake system, recirculation control means for controlling the amount of exhaust gas recirculated to the intake system in accordance with engine operating conditions, said recirculation control means including means for providing an exhaust gas recirculation ratio which is in a range between $(60-100\times 1/\lambda)$ and $(140-210\times 1/\lambda)$ under a predetermined engine operating range, where $\lambda$ is the excess air ratio. With this control of the exhaust gas recirculation, it is possible to suppress the emission of nitrogen oxides without losing the merit of a heat insulated auxiliary chamber.

The term "heat insulation means" used herein is intended to cover a structure in which the cylinder head material is not exposed to the auxiliary chamber except those areas where a glow plug and a fuel injection nozzle are to be installed. For example, the auxiliary chamber may be defined by a shell wholly or partly made of a heat insulating material. As an example, the shell may be formed by an upper half and a lower half which are connected together by a shrink-fit ring, as shown in the previously described Japanese utility model disclosure No. 58-175118. The upper half may then be made of a ceramic material containing zirconium oxides as essential components to provide a high heat insulating property, and the lower half may be made of a ceramic material containing silicon nitrides as essential components to provide a high thermal shock resistance. Alternatively, the shell may be made of a refractory ceramic material such as the one containing silicon nitrides as essential components and embedded in the cylinder head with a heat insulating space surrounding the shell. It is of course possible to have the shell made wholly or partly of a heat insulating ceramic material and embedded in the cylinder head with a heat insulating space surrounding the shell.

The above and other objects and features of the present invention will become apparent from the following description of a preferred embodiment taking reference to the accompanying drawings.

DESCRIPTION OF THE PREFERRED EMBODIMENT

Figure 1:
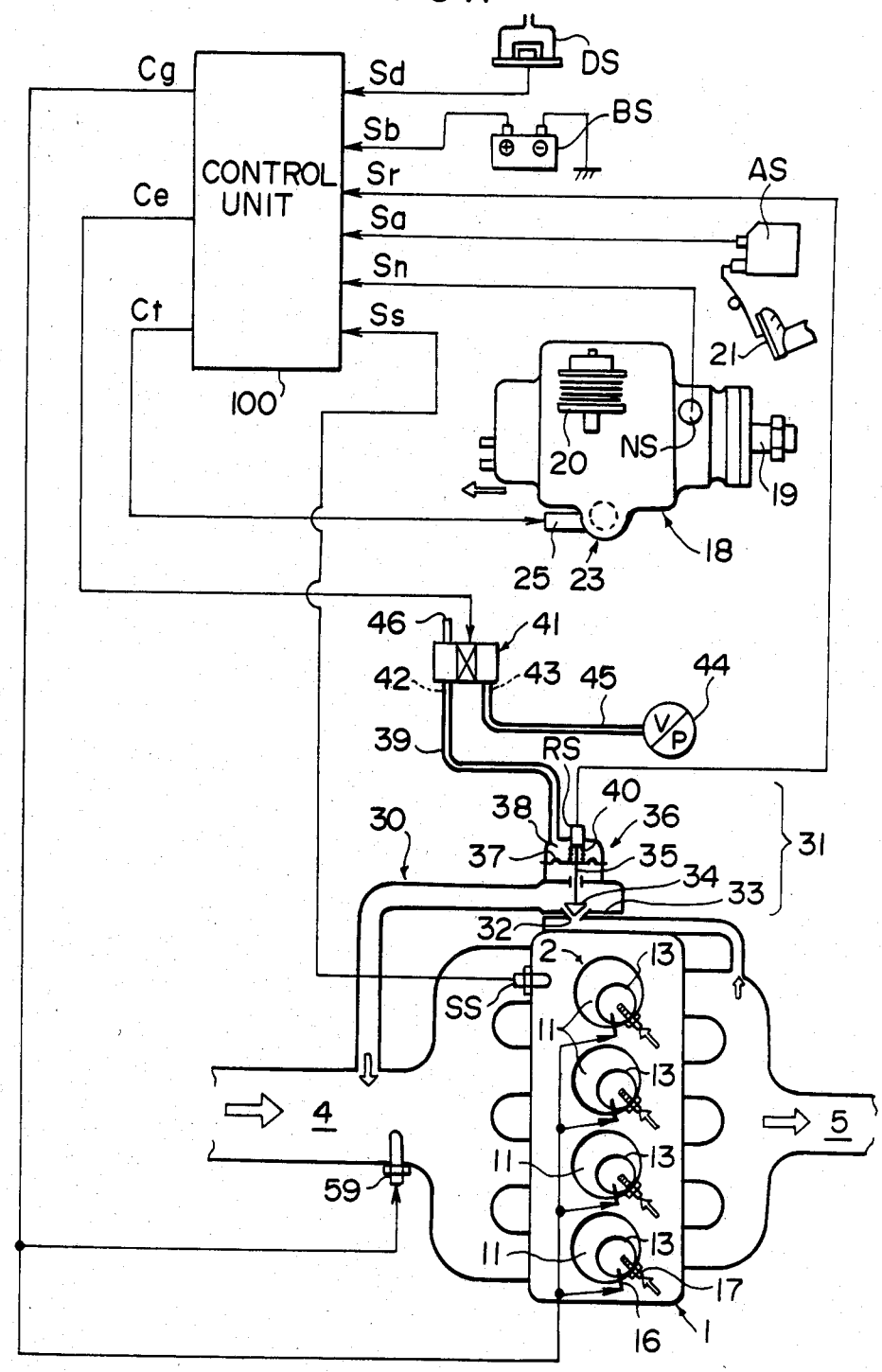
FIG. 1 is a diagrammatical illustration of a diesel engine having an exhaust gas recirculation control system in accordance with one embodiment of the present invention.
Figure 2:
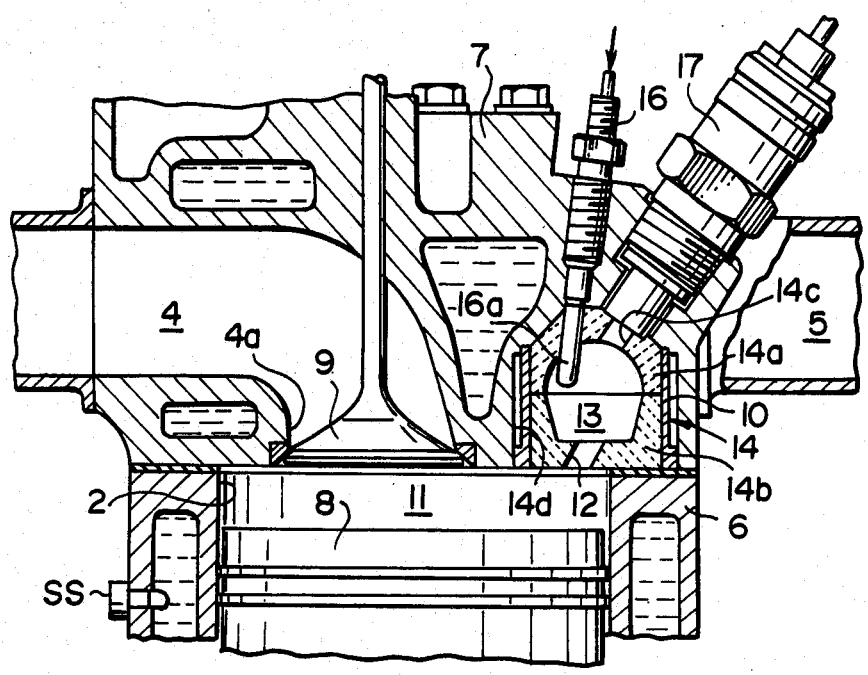
FIG. 2 is a vertical sectional view of the engine taken along a plane passing through the auxiliary chamber.

Referring to the drawings, particularly to FIG. 1, there is shown a four cylinder diesel engine 1 which includes cylinder bores 2 connected with an intake passage 4 and an exhaust passage 5. As shown in FIG. 2, the engine 1 includes a cylinder block 6 formed with the aforementioned cylinder bores 2. A cylinder head 7 is attached to the top surface of the cylinder block 6. In each of the cylinder bores 2, there is a reciprocating piston 8 which defines a main combustion chamber 11 in the cylinder bore 2 together with the cylinder head 7. The cylinder head 7 is formed with the aforementioned intake passage 4 which opens to the main combustion chamber 11 through an intake port 4a. An intake valve 9 is provided in the cylinder head 7 to cyclically open the intake port 4a. Although not shown in FIG. 2, the cylinder head 7 is also formed with the aforementioned exhaust passage 5 and an exhaust valve is provided to cyclically open the exhaust passage 5 to the main combustion chamber 11.

In the cylinder head 7, there is embedded an auxiliary chamber shell 14 for defining an auxiliary chamber 13 which is connected through a discharge port 12 with the main combustion chamber 11. The shell 14 includes an upper half 14a and a lower half 14b which are made of a refractory ceramic material such as one essentially containing silicon nitrides. The upper and lower halves 14a and 14b are secured to each other by a shrink-fit ring 10 which may be made of a corrosion resistant steel. The shrink-fit ring 10 has a flange portion extending radially outwardly at a lower portion thereof. An inner surface of the cylinder head 7 facing the auxiliary chamber shell 14 is formed with a step at an upper portion thereof. The shell assembly is embedded in the cylinder head 7 by connecting the upper portion of the shrink-fit ring with the step portion of the inner surface of the cylinder head 7, and connecting the flange portion of the shrink-fit ring 10 with the inner surface of the cylinder head 7 so that the lower half 14b faces the main combustion chamber 11. A space 14d is formed around the ring 10 to provide a heat insulating structure.

The upper half 14a of the shell 14 has a hole through which the heating probe 16a of a glow plug 16 extends to the auxiliary chamber 13. The upper half 14a is further formed with a fuel injection port 14c opening to the auxiliary chamber 13. A fuel injection valve 17 is mounted on the cylinder head 7 with the injection nozzle aligned with the fuel injection port 14c. The aforementioned discharge port 12 is formed in the bottom of the lower half 14b. The shell 14 provides a heat insulative structure as can clearly be understood. Alternatively, the shell half 14a may be made of a ceramic material essentially containing zirconium oxides and having a heat insulating property. The shell half 14b may be made of a refractory ceramic material such as one essentially containing silicon nitrides. The assembly may be embedded in the cylinder head 7 without any space around the shrink-fit ring 10. The cylinder block 6 is provided with an engine temperature sensor SS which detects the temperature of the engine cooling medium.

Referring to FIG. 1, it will be noted that the engine 1 is provided with a fuel pump 18 which has a drive shaft 19 driven by the engine crankshaft (not shown) so as to rotate synchronously with the engine crankshaft. The pump 18 is provided with a speed sensor NS which detects directly or indirectly the rotating speed of the drive shaft 19. The pump 18 is of a well known type and has a governor device 20 for supplying a metered quantity of fuel to the fuel injection valve 17. There is also provided an electronically controlled timer 23 which is adapted to be controlled by a fuel injection timing control valve 25 for determining the timing of fuel injection in accordance with engine operating conditions. For controlling the engine output, there is provided a foot pedal 21 the position of which is detected by a pedal position sensor AS. The position of the foot pedal 21 corresponds to the engine load Le.

Intake air is introduced in the intake stroke through the intake passage 4 into the main combustion chamber 11. The air is then forced in the compression stroke into the auxiliary chamber 13 through the discharge port 12 to form a swirl in the chamber 13. Fuel is injected from the valve 17 to the auxiliary chamber 13 to be mixed with the swirling air and ignited and burnt under the heat in the chamber 13. The combustion flame and the mixture are discharged through the port 12 to the main combustion chamber 11, and the combustion gas is discharged through the exhaust passage 5. In order to recirculate a part of the combustion gas in the exhaust passage 5 to the intake passage 4, there is provided an exhaust gas recirculation passage 30 between the passages 4 and 5. In the recirculation passage 30, there is a recirculation control valve 31 which includes a partition 33 formed with a port 32 and a valve member 34 which cooperates with the port 32. A diaphragm actuator 36 is provided for operating the valve member 34 through a valve rod 35. The diaphragm actuator 36 has a diaphragm 37 which is connected to the valve rod 35 and defines a suction pressure chamber 38. The suction pressure chamber 38 is connected through a conduit 39 with a suction pressure control valve 41. Further, in the chamber 38, there is provided a spring 40 which acts on the diaphragm 37 to force the valve member toward the closed position. There is also provided a valve position sensor RS to detect the opening of the port 32 in the partition 33.

Figure 3:
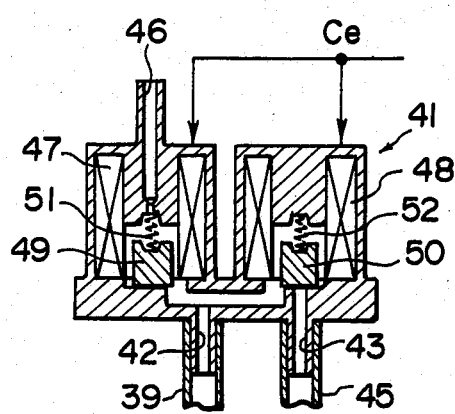
FIG. 3 is a sectional view of a suction pressure control valve used in the system shown in FIG. 1.

The suction pressure control valve 41 includes a valve body formed with an outlet port 42, a vacuum port 43 and an atmospheric pressure port 46. A passage is formed in the valve body to connect the ports 42, 43 and 46 with each other. The port 42 is connected through the conduit 39 with the suction pressure chamber 38. A solenoid valve comprising a solenoid 47 (see FIG. 3), a valve member 49 and a spring 51 is provided to control the atmospheric pressure port 46. The vacuum port 43 is connected through a conduit 45 with a vacuum pump 44 and is associated with a solenoid valve comprising a solenoid 48, a valve member 50 and a spring 52. When the solenoid 47 is energized, the port 46 is closed but the port 46 is normally communicated with the port 42. The valve member 50 is normally forced by the spring 52 to close the port 43 but, when the solenoid 48 is energized, the port 43 is opened to the port 42 to introduce suction pressure.

In order to control the operation of the suction pressure control valve 41, there is provided a control unit 100 which receives an engine temperature signal Ss from the engine temperature sensor SS. The control unit 100 further receives an engine speed signal Sn from an engine speed signal NS, an engine load signal Sa from the previously described engine load sensor AS, an EGR position signal Sr from the valve position sensor RS, a source voltage signal Sb from a power source or a battery BS and an atmospheric pressure signal Sd from an atmospheric pressure sensor DS. The control unit 100 performs an operation based on the signals Ss, Sn, Sa, Sr, Sb and Sd and produces a fuel injection timing signal Ct, an EGR signal Ce and a glow plug control signal Cg. The signal Ct is applied to the timing control valve 25 whereas the EGR signal Ce is applied to the suction pressure control valve 41. The glow plug control signal Cg is applied to the glow plug 16 and a glow register 59 which is provided in the intake passage 4.

Figure 4:
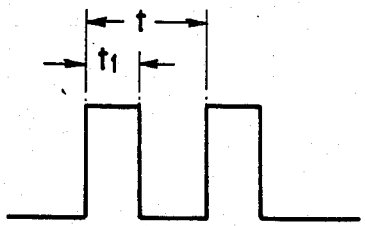
FIG. 4 is a diagram showing a pulse which is applied to the solenoid in the control valve.

FIG. 4 shows an example of the EGR signal Ce which comprises signal pulses each having a duration $t_1$ in a unit time t of a cycle. The exhaust gas recirculation is performed in a predetermined engine operating range, for example, under a mean effective pressure Pe of 1 to 6, an engine cooling medium temperature of 60° to 100° C. and an engine speed of 900 to 3,000 rpm. In such an engine operating range wherein exhaust gas recirculation is to be performed, the pulse duration $t_1$ is changed in accordance with the engine operating condition. Where exhaust gas recirculation is not to be performed, no signal pulse is applied to the suction pressure control valve 41.

The opening of the vacuum port 43 to the port 42 and the opening of the atmospheric pressure port 46 are determined by the duty factor $t_1/t$ of the signal pulses so that the suction pressure applied to the suction pressure chamber 38 in the diaphragm actuator 36 is controlled in accordance with the duty factor $t_1/t$ of the signal Ce. It will therefore be understood that the opening of the exhaust gas recirculation port 32 can be determined in accordance with the signal Ce which is in turn determined in accordance with the engine operating condition. When the EGR signal Ce is not applied to the control valve 41, the solenoids 47 and 48 are de-energized so that the port 42 is disconnected from the vacuum port 43 and opened through the port 46 to the atmosphere. Thus, atmospheric pressure is introduced into the chamber 38 of the diaphragm actuator 36 to force the valve member 34 to the closed position.

Figure 6:
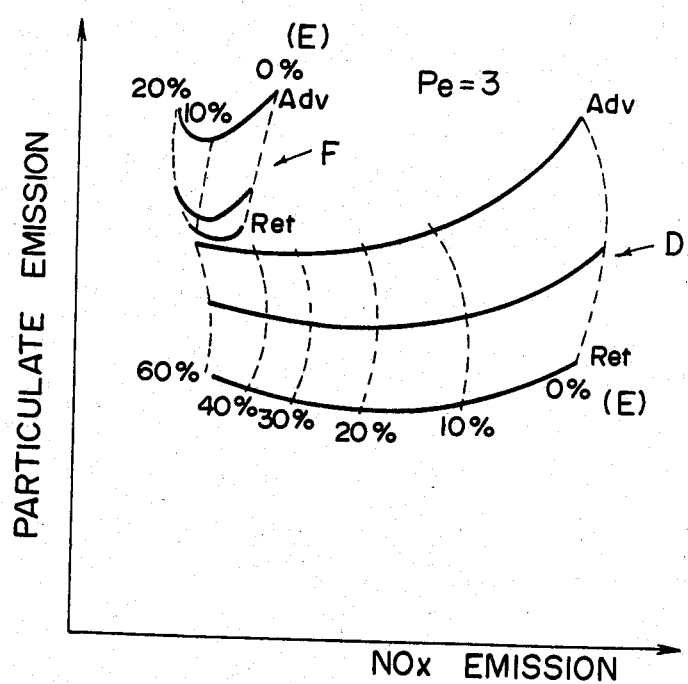
Figure 7:
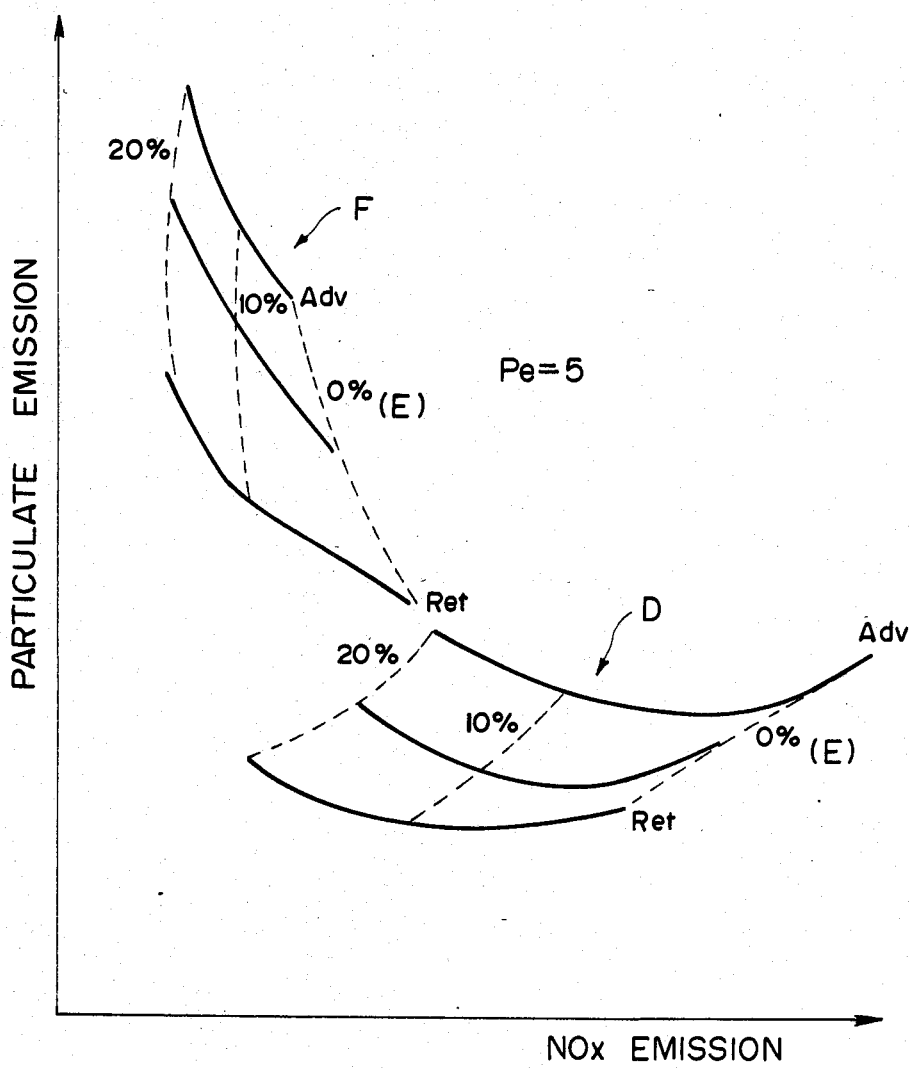

In the diesel engine described above, various tests have been made to measure quantitative changes in the noxious constituents in the exhaust gas in accordance with changes in the exhaust gas recirculation ratio E, expressed as a percentage, and the fuel injection timing under different mean effective pressure. Similar tests have also been made in a diesel engine having a conventional auxiliary chamber in which heat insulating measures are not adopted. The results are shown in FIGS. 5 through 7.

Figure 5:
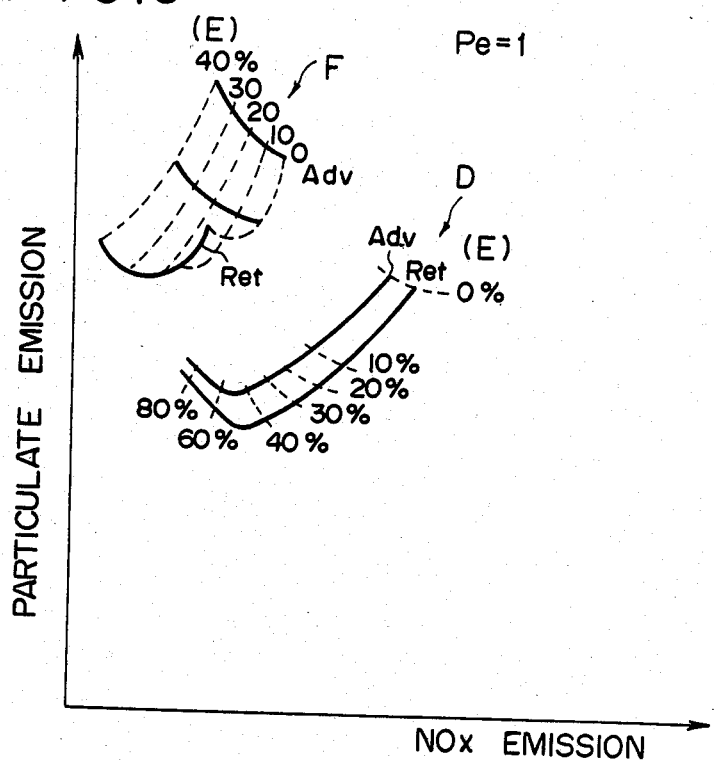
FIG. 5 through 7 are diagrams showing results of measurements of nitrogen oxide emissions.

FIG. 5 shows test results under the mean effective pressure Pe of 1 kg/cm$^2$ and the excess air ratio λ of approximately 4.2 at an engine speed of 2,000 rpm. For the purpose of reference, the engines are designed so that the mean effective pressure under maximum load is approximately 7.5 kg/cm$^2$. The curves D represent the results as obtained by the engine having the auxiliary chamber as shown in FIG. 2 whereas the curves F represent the results as obtained by the conventional engine. The dotted lines designate the exhaust gas recirculation ratios E and the solid lines designate the fuel injection timing. The solid lines designated as Adv represent the tests results obtained with an advanced fuel injection timing under which exhaust gas recirculation is not performed. The solid lines designated as Ret represent the test results obtained with a retarded fuel injection timing under which the exhaust gas recirculation is performed.

Figure 8:
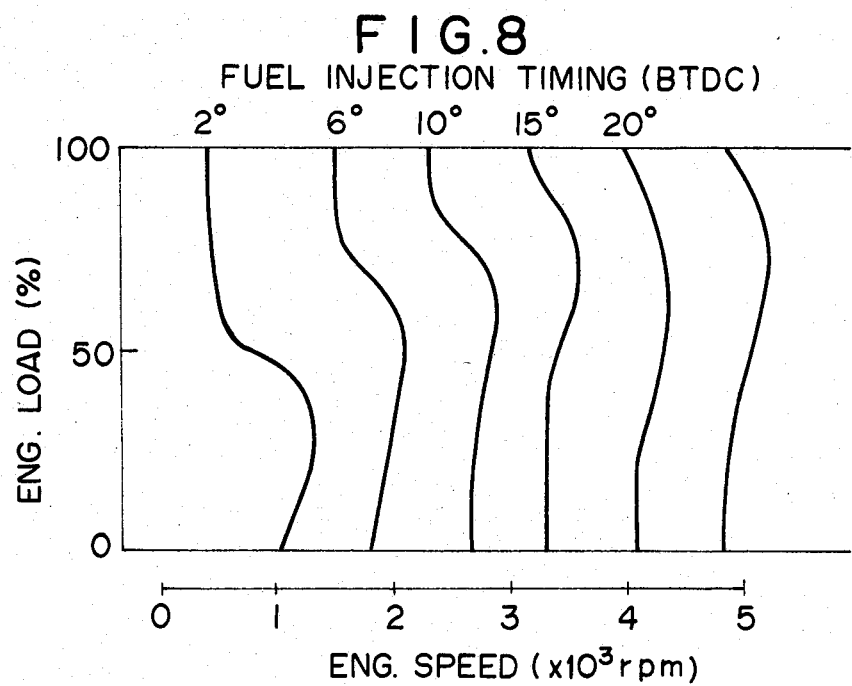
FIG. 8 is a diagram showing various fuel injection timings.

In general, the fuel injection timing in a diesel engine is controlled in accordance with a control map as shown in FIG. 8. In FIG. 8, each solid line designates the relationship between the engine load and the engine speed under a specific fuel injection timing defined in terms of a crank angle before top dead center. It will be understood from FIG. 8 that it is preferable to retard the fuel injection timing in a medium load range compared to a low load range and a heavy load range. It will be seen in FIG. 8 that, under a low speed range, the fuel injection timing is retarded in a medium load operation so that emissions of nitrogen oxides are suppressed in the medium load range, simultaneously decreasing the particulate emissions in a light load range and obtaining a high output in a heavy load range. In a high speed range, the fuel injection timing is retarded under a load range slightly lower than the maximum load range so that emissions of nitrogen oxides are decreased in such heavy load range, simultaneously decreasing the particulate emissions in a light load range and obtaining a high output in the maximum load range. The timings shown in FIG. 8 correspond to the retarded timing in FIG. 5 wherein exhaust gas recirculation is not performed. For the advanced timing, the fuel injection timing is advanced from the values shown in FIG. 8 by a predetermined value, for example, 6°.

In FIG. 5, it will be understood that under the light load range, the particulate emissions are always smaller in the engine having an auxiliary chamber of heat insulating structure than in the normal engine having no heat insulating structure in the auxiliary chamber. It will further be understood that in the engine having the heat insulating structure in the auxiliary chamber, the emissions of nitrogen oxides can be suppressed with the exhaust gas recirculation ratio of 40 to 60% to a level comparative to those in the normal engine, simultaneously decreasing the particulate emissions to a significant extent.

FIG. 6 shows test results under the mean effective pressure Pe of 3 kg/cm² with the excess air ratio λ of approximately 2.7 at the engine speed of 2,000 rpm. It will be understood in FIG. 6 that under a medium load range the particulate emissions are lower in the heat insulated engine than in the normal engine with the exhaust gas recirculation ratio of approximately 20 to 60%, and the emissions of nitrogen oxides are substantially the same in the heat insulated engine than in the normal engine with the exhaust gas recirculation ratio of approximately 40 to 60%.

FIG. 7 shows test results under the mean effective pressure Pe of 5 kg/cm² with the excess air ratio λ of approximately 1.8 at the engine speed of 2,000 rpm. In the heavy load engine operation, the particulate emissions are significantly lower in the heat insulated engine than in the normal engine whereas the emissions of nitrogen oxides can be suppressed to a level comparative to those in the normal engine with the exhaust gas recirculation ratio of approximately 10 to 20%.

Based on the aforementioned test results, the following formulae can be obtained to define upper and lower limits of a range of the exhaust gas recirculation ratio as functions of the excess air ratio λ:

$$E\text{max} = 140 - (210 \times 1/\lambda) \quad (1)$$

$$E\text{min} = 60 - (100 \times 1/\lambda) \quad (2)$$

Figure 9:
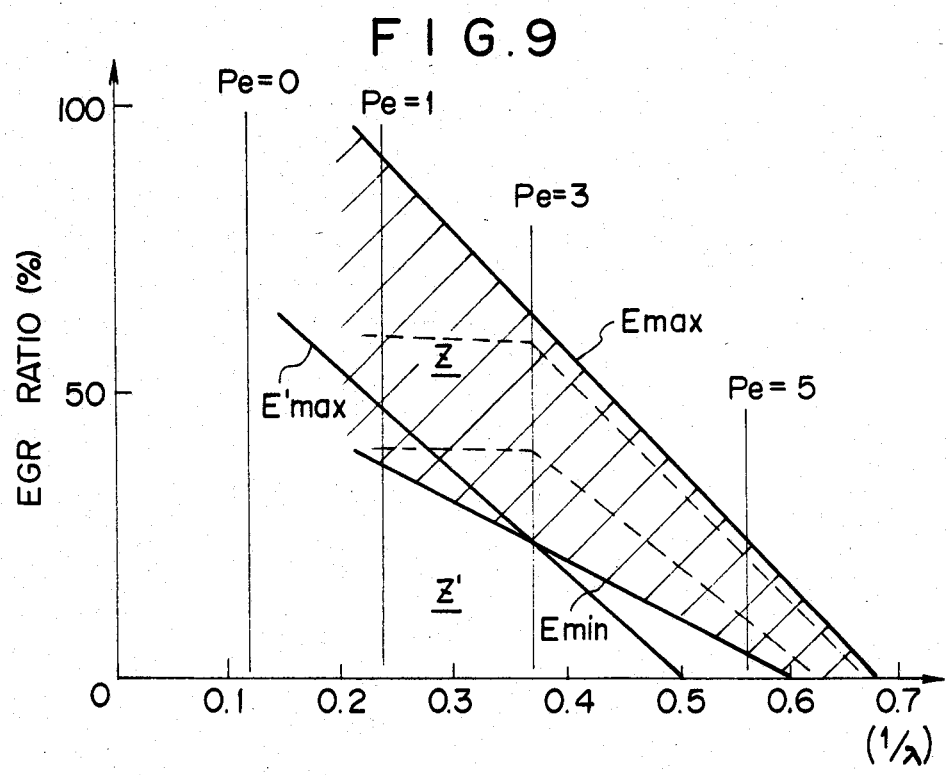
FIG. 9 is a diagram showing the relationship between the excess air ratio and the exhaust gas recirculation ratio; and, FIG. 10 is a flow chart showing an example of exhaust gas recirculation control.

The relationship as defined by the formulae (1) and (2) is shown in FIG. 9. The exhaust gas recirculation ratio E in the normal engine has only an upper limit which can be represented by the following formula.

$$E'\text{max} = 90 - (180 \times 1/\lambda) \quad (3)$$

The line representing the upper limit in the normal engine is also shown in FIG. 9. It will be understood that in the normal engine the exhaust gas recirculation is carried out in the region Z'.

It will be understood in FIG. 9 that, in the diesel engine having a heat insulating structure in the auxiliary chamber, a preferable range of the exhaust gas recirculation is a region Z bounded substantially by a vertical line representing 1/λ=0.2 and the lines Emax and Emin. More preferably, the exhaust gas recirculation ratio can be controlled in the aforementioned region to 40 to 60% under the mean effective pressure Pe of 1 to 3 kg/cm², the ratio being gradually decreased from those values to 15 to 20% under the mean effective pressure Pe of 5 kg/cm² as shown by the dashed lines lines. For that purpose an EGR control map is provided.

Figure 10:
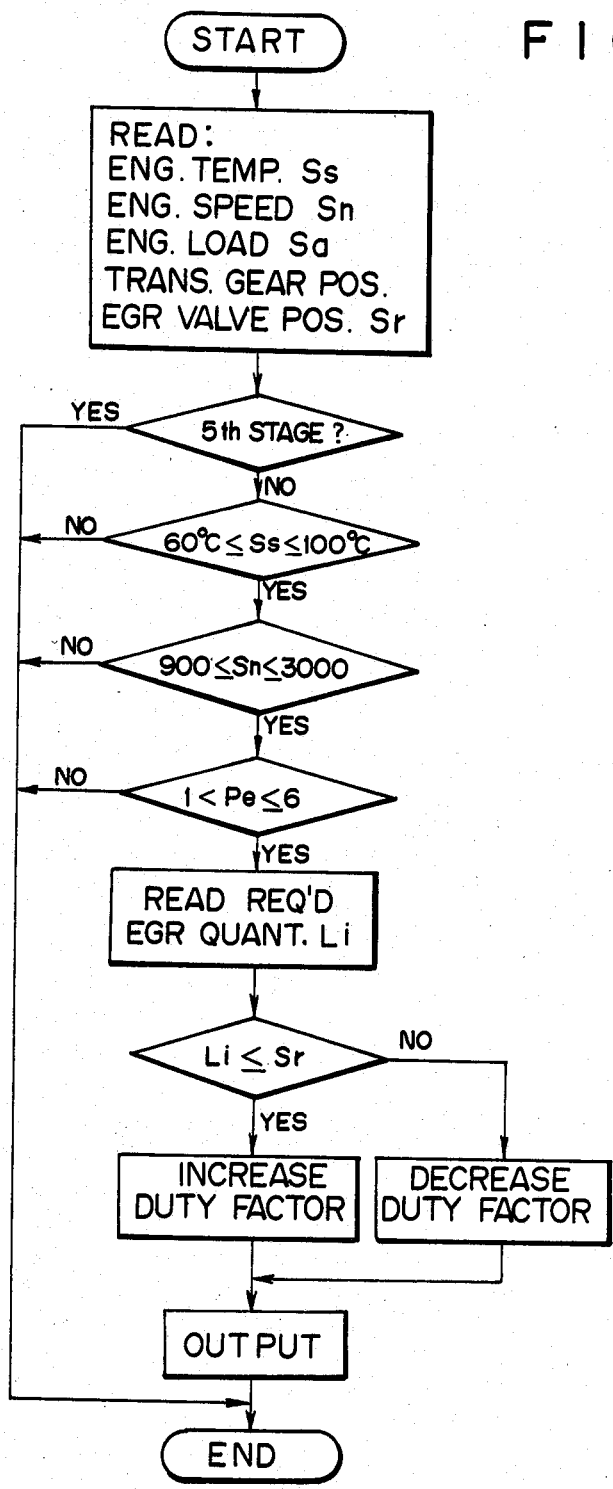

The control unit 100 produces an EGR signal Ce based on the input signals Ss, Sn, Sa and Sr so that the aforementioned preferable exhaust gas recirculation ratio is obtained in accordance with the engine operating condition. The control unit 100 may be constituted by a microprocessor which operates under an appropriate operation program. FIG. 10 shows an example of the operation of the control unit 100. At first, the engine temperature signal Ss, the engine speed signal Sn, the engine load signal Sa, a transmission gear position signal and the EGR control valve position signal Sr are read. Then, a judgement is made as to whether the transmission gear is at the fifth stage, that is, the highest stage. If the result of the judgement is YES, the control cycle comes to the end because the exhaust gas recirculation shall not be made under this gear position. If the result of judgement is NO, a further judgement is made as to whether the engine cooling medium temperature is between 60° C. and 100° C. If the result of the judgement is NO, the control cycle comes to the end but, if the result of the judgement is YES, a judgement is further made as to whether the engine speed is between 900 and 3,000 rpm. If the result of the judgement is NO, the control cycle comes to the end but, if the result of the judgement is YES, a further judgement is made as to whether the mean effective pressure Pe is between 1 and 6 kg/cm². If the result of the judgement is NO, the control cycle comes to the end but, if the judgement is YES, a required quantity Li of the exhaust gas recirculation is read from the EGR control map. Then the actual position Sr of the EGR control valve 36 is compared with the required quantity Li. The duty factor of the signal Ce applied to the suction pressure control valve 41 is then changed in accordance with the difference between the actual valve position signal Sr and the required EGR quantity signal Li.

The invention has thus been shown and described with reference to a specific embodiment. However, it should be noted that the invention is in no way limited to the details of the illustrated structures, but changes and modifications may be made without departing from the scope of the appended claims.

We claim:

1. A diesel engine comprising main combustion chamber means communicating with intake and exhaust means, auxiliary chamber means connected with said main combustion chamber means, said auxiliary chamber means being located in cylinder head means having an opening for housing said auxiliary chamber therein and an inner surface forming said space which includes a step at an upper portion thereof for securing said auxiliary chamber means in said opening, said auxiliary chamber means being defined by shell means made of a ceramic material and secured to a metallic ring provided therearound, said ring having a flange portion extending radially outwardly at a lower portion thereof, said ring having an outer surface defining an inner surface of heat insulative space between said outer surface and an inner surface of said cylinder head means and being secured to said cylincer head means by connecting an upper portion of said metallic ring with the step portion of the inner surface of said cylinder head means formed at the upper portion thereof and connecting said flange portion of said metallic ring with the inner surface of the cylinder head means, exhaust gas recirculation means for recirculating a controlled amount of exhaust gas from said exhaust means to said intake means, detecting means for detecting an engine operating condition, recirculation control means for controlling the amount of exhaust gas recirculated to the intake means in accordance with an engine operating condition detected by said detecting means, said recirculation control means including means for providing an exhaust gas recirculation ratio which is in a range between $(60 - 100 \times 1/\lambda)$ and $(140 - 120 \times 1/\lambda)$ during operation at an engine load greater than a predetermined load value, where λ is excess air ratio.

2. A diesel engine comprising main combustion chamber means communicating with intake and exhaust means, auxiliary chamber means connected with said main combustion chamber means, said auxiliary chamber means being located in cylinder head means and being defined by shell means including a lower ceramic section, an upper ceramic section and a metallic ring connecting said lower and upper sections, a heat insulative space between an outer surface of said metallic ring and an inner surface of said cylinder head means, said shell means being secured to said cylinder head means at positions of upper and lower ends of the metallic ring, exhaust gas recirculation valve means for regulating a controlled amount of exhaust gas recirculated from said exhaust means to said intake means through exhaust gas recirculation passage means, valve driving means for driving said exhaust gas recirculation valve means, load detecting means for detecting an engine load value, temperature detecting means for detecting an engine cooling medium temperature, recirculation control means for operating said valve driving means to drive said exhaust gas recirculation valve means to control the amount of exhaust gas recirculated to the intake means in accordance with an engine operating condition, said recirculation control means including means for providing an exhaust gas recirculation ratio which is in a range between $(60 - 100 \times 1/\lambda)$ and $(140 - 120 \times 1/\lambda)$ during an engine operating range where engine cooling medium temperature is higher than a predetermined temperature and where engine load is greater than a predetermined load value, where $\lambda$ is an excess air ratio.

3. A diesel engine in accordance with claim 2 in which said recirculation control means further includes means for controlling the exhaust gas recirculation ratio so that the recirculation ratio is zero in an engine operating range where engine cooling medium temperature is not higher than said predetermined temperature.

4. A diesel engine comprising main combustion chamber means communicating with intake and exhaust means, auxiliary chamber means having discharge port means communicating with said main combustion chamber and being located in cylinder head means, heat insulating means for insulating said auxiliary chamber means, fuel injection nozzle means opening to said auxiliary chamber means for injecting fuel thereinto and glow plug means extending into the auxiliary chamber means for igniting fuel therein, exhaust gas recirculation means for recirculating a controlled amount of exhaust gas from said exhaust means to said intake means, detecting means for detecting an engine operating condition, recirculation control means for controlling the amount of exhaust gas recirculated to the intake means in accordance with the engine operating condition detected by the detecting means, said recirculation control means including means for providing an exhaust gas recirculation ratio which is in a range between $(60 - 100 \times 1/\lambda)$ and $(140 - 210 \times 1/\lambda)$ during medium load engine operation range wherein engine load is greater than a first predetermined value and smaller than a second predetermined value, and where $\lambda$ is an excess air ratio, fuel injection pump means for injecting fuel into said auxiliary chamber means, fuel injection timing control means for retarding fuel injection timing during medium load engine operation wherein engine load is greater than a third predetermined value and smaller than a fourth predetermined value.

5. A diesel engine in accordance with claim 4 in which said recirculation control means includes means for controlling the exhaust gas recirculation ratio so that the recirculation ratio is zero in an engine operating range where engine load is not greater than said first predetermined value and in an engine operating range where engine load is not smaller than said second predetermined value.

6. A diesel engine in accordance with claim 4 in which said fuel injection timing control means further includes means for retarding, under a low engine speed range, the fuel injection timing in the medium load engine operation range and retarding, under a high engine speed range, said fuel injection timing in a load operation range higher than the medium load engine operation range.

7. A diesel engine in accordance with claim 4 in which the recirculation control means includes control map means for setting exhaust gas recirculation ratio based upon engine mean effective pressure, the exhaust gas recirculation ratio between engine mean effective pressures of from about 1 $Kg/cm^2$ to about 3 $Kg/cm^2$ ranging between about 40% to about 60%, and the exhaust gas recirculation ratio between engine mean effective pressures of from about 3 $Kg/cm^2$ to about 5 $Kg/cm^2$ ranging between a first control line extending between and defined by a first point at which the engine mean effective pressure is substantially 3 $Kg/cm^2$ and the exhaust gas recirculation ratio is substantially 60% and a second point at which the engine mean effective pressure is substantially 5 $Kg/cm^2$ and the exhaust gas recirculation ratio is substantially 20%, and a second control line extending between and defined by a third point at which the engine mean effective pressure is substantially 3 $Kg/cm^2$ and the exhaust gas recirculation ratio is substantially 40% and a fourth point at which the engine mean effective pressure is substantially 5 $Kg/cm^2$ and the exhaust gas recirculation ratio is substantially 15%.

8. A diesel engine comprising main combustion chamber means communicating with intake and exhaust means, auxiliary chamber means connected with said main combustion chamber means, said auxiliary chamber means being formed from refractory means and being located in cylinder head means, a heat insulative space between an outer surface of the refractory means an an inner surface of the cylinder head means, exhaust gas recirculation means for recirculating a controlled amount of exhaust gas from said exhaust means to said intake means, engine load detecting means for detecting an engine load, recirculation control means for controlling an amount of exhaust gas recirculated to the intake means in accordance with an engine operating condition, said recirculation control means including means for providing an exhaust gas recirculation ratio which is gradually decreased in response to an increase in engine load detected by said engine load detecting means and during an engine operating condition where engine load is greater than a predetermined value and where mean effective combustion chamber pressure Pe is not higher than 3 $Kg/cm^2$.

9. A diesel engine in accordance with claim 8 in which said recirculation control means includes means for providing an exhaust gas recirculation ratio which is gradually decreased in response to an increase in engine load so that the recirculation ratio is zero when the excess air ratio is not smaller than 0.7.

10. A diesel engine in accordance with claim 8 which further includes fuel injection timing control means for retarding fuel injection timing during medium engine load operation wherein engine load is greater than a first predetermined value and smaller than a second predetermined value.

11. A diesel engine in accordance with claim 8 in which said refractory means is made of a ceramic material.

* * * * *